United States Patent Office

3,205,156
Patented Sept. 7, 1965

3,205,156
METHOD OF PREPARING POLYOLEFINE AND POLYSTYRENE GRAFT COPOLYMERS HAVING AN ALKYLENE IMINE BONDED THERETO
Yuhji Atarashi, Ohtsu-shi, Shiga-ken, Japan, assignor to Toyo Rayon Kabushiki Kaisha, Tokyo, Japan, a corporation of Japan
No Drawing. Filed Mar. 20, 1962, Ser. No. 181,165
Claims priority, application Japan, Mar. 23, 1961, 36/10,156
11 Claims. (Cl. 204—154)

This invention relates to a method of preparing shaped articles of polyolefines having good dyeability. More particularly, it relates to a method of preparing polyolefines having excellent dyeability which comprises after graft or block polymerizing polyolefines with acrylic acid, methacrylic acid or the derivatives thereof, contacting them with one or more alkylene imines or the derivatives thereof which have in their molecules one or more of the following groups:

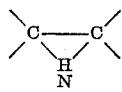

The shaped articles of polyolefines that are obtained by the method of the present invention can be dyed readily by the dyeing methods that have been employed in connection with other fibers. Shaped articles of polyolefines that particularly excel in their dyeability with anionic dyes such as direct dyes and acid dyes can be obtained. Shaped articles produced from the crystalline polyolefines such as polyethylene, polypropylene and the like are very useful since they are lighter in weight and moreover excel in such properties as mechanical strength, elasticity, etc. On the other hand, with these polyolefines from a chemical structure standpoint being high molecular weight hydrocarbons and not possessing polar groups in their molecules, they possess a few properties that are unsatisfactory from the practical standpoint. The greatest drawback possessed by the polyolefine fibers is the fact that their dyeability is deficient. Namely, even though the known dyes are used in case of polyolefine fibers and the dyeing methods that have been used in the past for the other natural and synthetic fibers are employed, they hardly dye at all. The present invention concerns a method of resolving the difficulty incurred in the dyeing of shaped articles of polyolefines, particularly fibers and films.

The present invention comprises graft or block polymerizing polyolefines with at least one of either acrylic acid or methacrylic acid singly, or a mixture thereof with other vinyl monomers, followed by treating with an alkylene imine. The graft polymerization and the treatment with an alkylene imine may be effected together before the molding of the shaped article, or the graft polymerization alone may be performed prior to molding while the treatment with alkylene imines is performed after molding. Among the methods, those of importance are as follows:

(A) The method of utilizing ionizing radiation.

After irradiating the starting materials such as polyolefines in powder, pellet or flake form with an ionizing radiation in air or an atmosphere of other gases, contact of the polyolefines is effected with vinyl monomers as a vapor, liquid or solution phase. The method in which the vinyl monomer is caused to be copresent during irradiation by the ionizing radiation is also known.

(B) The method of utilizing the formation of a hydroperoxide by means of oxidation.

After forming a hydroperoxide in the polyolefine molecules by oxidizing the starting material such as polyolefines in powder or other forms, in a similar manner to the A method, in air or other gases containing oxygen, draft polymerization is effected by contacting the polyolefines with vinyl monomers.

(C) The method of utilizing the shearing of the molecules by means of shearing stress.

The material polyolefine similar to that used in A is mixed with vinyl monomers near the melting point of the former and then by applying shearing stress the polyolefine molecules are sheared and the vinyl monomers are graft or block polymerized at the point of shear.

(D) The method of utilizing the shearing of the molecules by means of thermal degradation.

The material poly-alpha-olefine is maintained at a temperature 20° C. above its melting point thereby shearing the polyolefine molecules thermally and then by effecting contact with vinyl monomers the graft or block polymerization is carried out.

After having carried out the graft or block polymerization of acrylic acid or methacrylic acid by the methods described above and then molding, the treatment by means of an alkylene imine may be done, or it is also possible to perform the alkylene imine treatment immediately after polymerization before molding. When performing the alkylene imine treatment before molding, if the product is in the form of blocks the treatment is difficult of performing. Therefore, it is preferred that it is in the form of either a powder or flakes. The alkylene imine treatment may also be effected after rendering the product into the form of either pellets, strands or sheets. As the alkylene imines used in the method of this invention, included are the alkylene imines having the

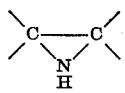

group such as ethylene imine, 1,2-propylene imine, 1,2-butylene imine, 2,3-butylene imine, isobutylene imine, tetramethylethylene imine and cyclohexylethylene imine, and the N-substituted compounds thereof. As the N-substituted compounds that are used in the invention, the following can be named, for example:

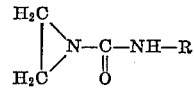

Ethyleneurea compounds (provided that R is a substituted group such as hydrocarbon group. The same applies to the following.)

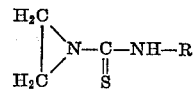

Ethylenethiourea compounds

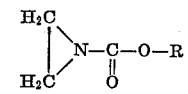

Ethyleneurethane compounds

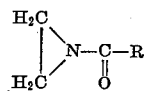

Ethyleneimido compounds

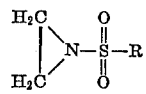

Ethylenesulfamide compounds

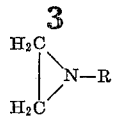

N-alkyl (or aryl) thyleneimine

The above substituted group R include chiefly the alkyl, aryl and cycloalkyl hydrocarbon groups having less than 30 carbon atoms. These may contain atoms other than carbon and hydrogen. The compounds contain in their molecules two or more of the above groups such as ethyleneurea ethylenethiourea, ethylene urethan and ethyleneimide may also be used. As examples of such compounds, there are the following:

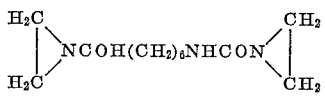

Hexamethylene-bis-ethyleneurea

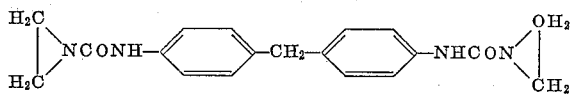

p,p'-Bis(ethyleneurea) diphenyl methane

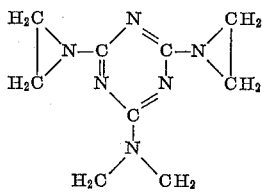

2,4,6-tris-(arylidinyl)-S-triazine

While all of those given above are examples of ethylene imine derivatives, the derivatives that correspond to the above of the other alkylene imines can also be used.

In treating polyolefines using alkylene imines not having an N-substituted group, the alkylene imines may be used in any of the states of either a liquid phase, vapor phase or solution phase. Although the polyolefine powder or pellets graft polymerized with acrylic acid or methacrylic acid may be treated by merely immersing in the treatment liquor at room temperature in case alkylene imines in their liquid form are used, they may also be heated at to temperature less than 150° C. in an autoclave, if necessary. There is also a method of effecting contact of the treatment liquor with the polyolefines to be treated by means of a shower at a high temperature above 150° C. When the alkylene imine is to be used diluted, as the diluent, water, ether, alcohol, and the hydrocarbons such as hexane, heptane, etc. are suitable. Moreover, when the alkylene imine is to be used in its vapor phase, it may be used as the vapor of alkylene imine singly, or it may be used diluted with a gas inert to alkylene imine such as nitrogen, methane, ethane and water. In this case, the treatment temperature of about 50–150° C. is suitable. Another method is that of dispersing or dissolving the polyolefines in a solvent such as water and hydrocarbons and then blowing therein a gas containing an alkylene imine. It is also permissible to mix and use two or more alkylene imines.

While those alkylene imines having an N-substituted group whose boiling points are low may be used in their vapor phase, generally the treatment is more easily carried out if they are used after dissolving or suspending in a solvent such as water, alcohol, hydrocarbons, etc. Needless to say, it is also possible to use them without diluting. The concentration of the treatment liquor of about 1–20% is convenient to use. The treatment temperature of 0–150° C. is suitable, good results being obtained in most instances at room temperature or by heating to less than 100° C. When the material being treated is in the form of a powder the time required for treatment may be short. However, in case of pellets, a maximum of several hours is required.

The polyolefines that have proceeded through the steps of graft or block polymerization and treatment with alkylene imines, as described hereinbefore, are, if necessary, washed with water and dried, after which they are ready to be used for the production of fibers, films, etc. While a homogeneous product is obtained when the graft polymerization and the alkylene imine treatment are carried out with the powdered form of polyolefines, in case the alkylene imine treatment is performed with the pellet form, the bonding of the alkylene imine occurs chiefly on the surface of the particles. Therefore, if necessary, for achieving homogeneity, it is recommended that prior to molding, kneading with heated rollers, or mixing with a Werner mixer, etc. be performed. The molding can be performed by conventional techniques.

On the other hand, as another method the graft polymerization (or block polymerization) of acrylic acid or methacrylic acid can be performed before molding, and then after molding, the treatment with alkylene imines be performed. In this case, the conditions of treatment with alkylene imines is the same as in the case described hereinbefore. However, in this case, there is the necessity of preventing the excessive deformation of the shaped article by using a treatment temperature below the softening point of the polyolefine. This treatment step with alkylene imines can be performed during any of the processing stages subsequent to molding, there being no limitation particularly as to the form of the shaped article. For example, in case of textile products and the treatment with alkylene imines is possible with any of the following, namely: monofilaments, multifilaments, tows, tops, staples, spun yarns, knitted or woven fabrics, sewn products, etc. In addition, the alkylene imine treatment can also be performed during the intermediate stages of formation, for example, in case of undrawn fibers and films.

According to a third method of practicing this invention, the polyolefines as such, without any treatment, are molded into fibers, films, etc., then graft polymerized with at least one of either acrylic acid or methacrylic acid and under certain circumstances with another vinyl monomer, and then treated with alkylene imines. As the methods of graft polymerization, the aforementioned A (the method by means of ionizing radiation) and B (the method utilizing the formation of a hydroperoxide by oxidation) are employed mainly. According to this third method the graft polymerization and the treatment with alkylene imines can be carried out at any optional stage subsequent to molding, and furthermore they can be performed separately. For example, taking the case of fibers, the graft polymerization can be carried out with the undrawn fiber, and the alkylene imine treatment, after drawing has been completed; or the graft polymerization effected in the tow state and the alkylene imine treatment in the staple, spun yarn or woven fabric state. While the method and conditions of the treatment with alkylene imine will follow that already mentioned hereinbefore, in this case also, there is the necessity of maintaining the treatment temperature below the temperature at which the polyolefines soften excessively.

The polyolefines that the method of this invention can be applied to include the homopolymers of monoolefines and diolefines such as polyethylene, polypropylene, poly(butene-1), poly (3-methylbutene-1), poly (4-methylpentene-1) and polybutadiene, the copolymers such as ethylene propylene, ethylene butene-1 and propylene butene-1, or the mixtures of these polyolefines. The method of this invention also can be applied to polystyrene and mixtures of polystyrene with the aforementioned polyolefines.

These polyolefines may also contain a stabilizer for resisting light or heat, a plasticizer for enhancing fluidity, and other agents such as an opacifier. And also, while it is usual that polymers of vinyl monomers that do not bond to the polyolefine molecules are formed incidentally, the molding and alkylene imine treatment can be carried out without especially removing them. However, these may be removed by such methods as washing with solvents or extraction. The amount bonded to the polyolefines of the acrylic acid or methacrylic acid that is suitable is 0.05–10%, 0.1–5% being particularly preferred. Although the amount may be greater than this, for the purpose of imparting dyeability an amount within this range is sufficient, the use of a greater amount being usually unnecessary.

Also, according to the invention, instead of graft or block polymerizing acrylic acid or methacrylic acid, the derivatives of acrylic acid or methacrylic acid, such as (2-ethylhexyl) acrylate, acrylamide, acrylic chloride, methyl methacrylate, (n-butyl) methacrylate, methacrylic amide, acrylonitrile, sodium acrylate, potassium methacrylate, etc., singly or in combination with other vinyl monomers may be bonded to polyolefines in the aforementioned manner and thereafter by means of hydrolysis achieving the state in which acrylic acid or methacrylic acid has been graft or block polymerized, followed by a treatment with such as alkylene imines.

In using other vinyl monomers in combination with the acrylic acid methacrylic acid, or the derivatives thereof, the amounts used of each of the vinyl monomers, should be so selected such that the acrylic acid, methacrylic acid, or the derivatives thereof occupy more than about 50 mol percent of the total monomers that have been graft or block polymerized.

As the vinyl monomers that may be used in combination, any that are capable of being graft or block polymerized to olefines can be used. Included are, for example, acrylonitrile vinyl chloride, vinylidene chloride, vinyl acetate, etc.

Example 1

After irradiating a polypropylene tow consisting of 2 denier monofilaments with an electron beam of $10^6$ rad. by means of a Van de Graff electron accelerator, it was immersed in a solution consisting of a mixture of ethyl lactate and acrylic acid in the ratio (weight) of 9:1, followed by heating for three hours after having removed the air. Then it was extracted with hot water for 24 hours and dried. The weight increase resulting from the graft of acrylic acid was 0.2%. Then after suspension for 2 hours in a stream of ethylene imine at 80° C., it was washed, and a dyeing test with an acid dye was performed under the following conditions;

Dye: Du Pont Anthraquinone Blue SWF
Quantity of dye used based on fiber: 3% weight)
Bath ratio: 100
pH of dye bath: 2.5
Temperature: 98° C.
Time: 1 hour After the above dyeing treatment, soaping was carried out for 10 minutes at 80° C. using a 0.2% aqueous solution of Scourol No. 100 (a cationic surface-active agent produced by Kao Soap Company) with a bath ratio of 100. As a result, polypropylene fibers which dyed a vivid deep shade was obtained.

Example 2

To 950 grams of polypropylene powder (having in inherent viscosity of 2.5 measured in tetraline at 135° C.) was mixed 50 grams of methacrylic acid, which mixture was then molded into pellets employing a screw extruder having a diameter of 30 mm. The temperature in the central portion of the extruder was 225° C. while the die temperature was 40° C. The strand of polymer coming out from the extruder was quenched in water followed by cutting into pellets. By this procedure, pellets were obtained consisting of polypropylene to which had been graft polymerized methacrylic acid. Next, this polymer was melt spun at 260° C. by means of an apparatus for test spinning of fibers from its spinneret having a single hole of 0.5 mm. diameter x 1 mm., followed by drawing 8× at 120° C. in a glycerine bath. One gram of the drawn fiber was immersed in 50 grams of ethylene imine, then heated for 3 hours at 50° C. and thereafter washed with water. When this was given a dyeing test under the same conditions as in Example 1, it dyed a deep shade.

Example 3

Employing the same method as in Example 2, except that acrylic acid was used instead of methacrylic acid, pellets were obtained consisting of polypropylene to which had been graft polymerized acrylic acid. The polypropylene powder used and the conditions of treatment were identical to that of Example 1. These pellets were pressed while being melted between heated glass plates thereby preparing a film having a thickness of about 0.1 mm. The so obtained film was heated under refluxing for 2 hours with a 20% aqueous solution of ethylene imine followed by washing with water. This was then given dyeing tests under the same conditions as in Example 1 with the exception that the dyes were varied. When dyed with the acid dyes Xylene Brilliant Green 3 GM, Xylene Brilliant Blue 5 GM, and Benzo Tast Scarlet 4 BA, in each case, it dyed a vivid medium shade.

Example 4

The methacrylic acid grafted polypropylene pellets prepared in Example 2 was treated for 5 hours at atmospheric pressure in a stream of ethylene imine vapor at 95° C. This was then melt spun at 260° C. using a testing apparatus for melt spinning fibers by spinning the polymer from its single-hole spinneret, after which the fiber spun was drawn 8× in a glycerine bath at 120° C. The drawn fiber of 45 deniers was given dyeing tests under the same conditions as given in Example 1, the acid dyes used being Du Pont Anthraquinone Blue 3 WF, Xylene Fast Yellow P, and Acid Scarlet. In all cases, the fiber dyed a vivid medium shade.

Example 5

Polypropylene powder (having an inherent viscosity of 2.0 measured in tetraline at 135° C.) was irradiated with an electron beam of $6 \times 10^6$ rad. by means of a Van de Graff electron accelerator, followed by immersion in a mixed liquor of ethyl lactate and acrylic acid in the ratio of 9:1, and then after heating for 1 hour at 60° C. the polymer was separated by filtration and washed with a mixed liquor of acetone and water, whereby was obtained polypropylene to which was graft polymerized 7.2% of acrylic acid. 100 grams of this powdered graft polymer while being stirred with a 50% aqueous solution of ethylene imine was heated under refluxing for 2 hours, after which the polymer was separated by filtration, washed with water and then vacuum dried at 50° C.

To the thus treated polymer was added 900 grams of the original polypropylene powder which had not received any treatments at all, and the two were mixed until homogeneity was achieved, which thereupon was made into pellets using an extruder and then spun and drawn. When the fiber 8× (51 deniers) and that drawn 10× (42 deniers) were given a dyeing test by the procedure described in Example 1, they both dyed a vivid medium shade.

Example 6

The sequence of the ethylene imine treatment and fiber drawing of Example 5 were reversed. Namely, 100 grams of the powdered graft polymer obtained by the procedure described in Example 5 was mixed with 900 grams of untreated polypropylene powder and molded into pellets with a screw extrudler of 30 mm. diameter. This was followed by spinning and drawing, whereby was obtained a monofilament drawn 8× having a denier of 47. Next, this was treated by immersion in a 50% aqueous ethylene imine solution, heating under refluxing for 2 hours and thereafter washing with water. The so obtained fiber, when given a dyeing test in accordance with the procedure described in Example 1, showed dyeability equivalent to that obtained in Example 5.

Example 7

The surface of a 32 denier polypropylene monofilament was oxidized by means of air thereby forming a hydroperoxide which was contacted with a 50% aqueous of acrylic acid in an atmosphere of nitrogen to thereby effect the graft polymerization of 0.3% of acrylic acid. This was followed by treating for 1 hour at 85° C. in a vapor stream consisting of a mixture of substantially equal amounts of ethylene imine and n-pentane. The so obtained product, when dyed by the procedure described in Example 1, dyed a medium shade.

Example 8

One gram of the fiber prepared in Example 2 consisting of methacrylic acid grafted polypropylene spun and drawn 8× was immersed in a mixture consisting of 3 grams of octadecoethyleneurea

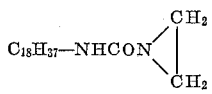

and 57 grams of water. After immersion for 3 hours at room temperature, it was removed and washed with water. When this fiber was dyed in accordance with the procedure described in Example 1, it dyed a medium shade.

Example 9

When, in lieu of the octadecoethyleneurea used in Example 8, hexamethylene diethylene urethan was used, and immersion was carried out for 1 hour at 65° C., a product having dyeability of about the same degree as that of Example 8 was obtained.

Example 10

To 960 grams of propylene powder (having an inherent viscosity of 2.25 measured in tetraline at 135° C.) were mixed 20 grams of acrylic acid and 20 grams of methacrylic acid, which mixture was then extruded with an extruder of 30 mm. diameter thereby forming pellets and simultaneously effecting graft polymerization (or block polymerization). The die temperature was 250° C. Next, using an apparatus for test spinning of fibers the so obtained polymeric material was extruded through a spinneret having ten holes, each 0.3 mm. in diameter and 0.6 mm. in depth, followed by drawing 4.5× on a heated plate at 100° C. thereby obtaining a 46 denier multifilament consisting of 10 filaments. This multifilament was treated continuously by contacting it for 2 minutes with an ethylene imine vapor of 110° C. After treatment, the fiber was washed with water. When the dyeing was performed in accordance with the procedure described in Example 1, it dyed a medium shade.

Example 11

To 985 grams of polypropylene powder (having an inherent viscosity of 2.5 measured in tetraline at 135° C.) 10 grams of acrylic acid and 5 grams of methacrylic acid were mixed homogeneously, which mixture was then made into pellets, spun and drawn under the same conditions as in Example 10, excepting that the draw ratio was 5.0×, whereby was obtained a 35 denier multifilament consisting of 10 filaments. 5.0 grams of this fiber was immersed in ethylene imine, after which it was immediately removed therefrom and pressed between glass plates thereby squeezing out a part of the ethylene imine to leave 1.5 grams of ethylene imine adhering. Then the fiber was placed in an autoclave and heated for 30 minutes at 105° C., following which it was washed with water. When the so treated fiber was given a dyeing test in accordance with the procedure described in Example 1, it dyed a vivid deep shade. Further experiments under the same conditions were carried out several times with an ethylene imine treatment time of 20 minutes, and dyeing tests were performed using the acid dyes Supuranol Yellow O, Supuranol Scarlet G, Supuranol Brilliant Blue FG, and Roccelline NS. In all of the instances the fiber dyed a medium to deep shade.

Example 12

Polyethylene powder obtained by the low-pressure process to which was graft polymerized 3.6% of methyl methacrylate using an electron beam was melt spun from a single-hole spinneret of a small scale apparatus for test spinning of fibers, then drawn 5.0× thereby obtaining a 65 denier monofilament. This monofilament was boiled for 5 hours in a 10% aqueous caustic soda solution, followed by washing with dilute hydrochloric acid and water in the order given, and thereafter held in a stream of ethylene imine vapor for 3 hours. When the resultant fiber was given a dyeing test in accordance with the procedure described in Example 1, it dyed a deep shade.

Example 13

To 950 grams of the polypropylene described in Example 1 were mixed homogeneously 20 grams of acrylic acid and 30 grams of butyl acrylate, which mixture was then made into pellets by extruding from a screw extruder having a diameter of 30 mm. The temperature of the central part of the screw was 230° C. while the die temperature was 245° C. By spinning with an apparatus for test spinning of fibers and drawing 8× in a glycerine bath, a 43 denier monofilament was obtained. After treating the so obtained monofilament for 2 hours at 45° C. in a mixture consisting of equal amounts of ethylene imine and propylene imine, it was given the dyeing test described in Example 1, whereby it dyed a deep shade.

Having thus described the nature of the invention what I claim is:

1. A method improving the dyeability of polymers selected from the group consisting of polyolefins, mixtures of polyolefiins, polystyrene and mixtures thereof which comprises graft coplymerizing said polymers with a compound selected from the group consisting of acrylic acid, methacrylic acid, and the derivatives therof which are hydrolyzed into a compound selected from the group consisting of acrylic acid and methacrylic acid under the operating conditions maintained during copolymerization, and thereafter contacting the thus formed grafted copolymer with at least one compound selected from the group consisting of alkylene imines and the N-substituted derivatives thereof, said alkylene imines and the N-substituted derivatives thereof having in their molecules at least one of group of the following formula

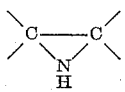

said contacting effecting a bonding between said grafted copolymer and said alkylenes imines and the N-substituted derivatives thereof.

2. The method as defined in claim 1 in which said alkylene imines and the derivatives thereof are selected from the group consisting of ethylene imine, 1,2-propylene imine, 1,2-butylene imine, 2,3-butyl-imine, isobutylene imine, tetramethyl ethylene imine, cyclohexylethylene imine, alkyl ethyleneurea, aryl ethyleneurea, cycloalkyl ethyleneurea, alkyl ethylenethiourea, aryl ethylenethiourea, cycloalkyl ethylenethiourea, alkyl ethylene urethan, aryl ethylene urethan, cycloalkyl ethylene urethan, alkyl ethylene imide, aryl ethylene imide, cycloalkyl imide, alkyl ethylene sulfamide, aryl ethylene sulfamide, cycloalkyl ethylene sulfamide, N-alkyl ethylene imine, N-alkyl ethylene imine, N-aryl ethylene imine, hexamethylene-bis-ethylenueurea, p,p'-bis - (ethyleneurea)diphenylmethane, 2,4,6-tris-(aryl-idinyl)-S-triazine.

3. The method as defined in claim 1 wherein polymerization is effected by ionizing radiation.

4. The method as defined in claim 1 wherein polymerization is effected by the formation of a hydroperoxide of the polymer by means of oxidation.

5. The method as defined in claim 1 wherein polymerization is affected by the shearing of molecules by means of shearing stress.

6. The method as defined in claim 1 wherein polymerization is effected by the shearing of molecules by means of thermal degradation.

7. A method of improving the dyeability of polyolefins which comprises graft copolymerizing polyolefins with a material selected from the group consisting of acrylic acid, methacrylic acid, the derivatives thereof which are hydrolyzed into a compound selected from the group consisting of acrylic acid and methacrylic acid under the operating conditions maintained during copolymerization and mixtures thereof, contacting the thus formed grafted copolymer with at least one compound selected from the group consisting of alkylene imines and the N-substituted derivatives thereof, said alkylene imines and the N-substituted derivatives thereof having in their molecules at least one group of the following formula

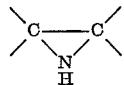

said contacting effecting a bonding between said grafted copolymer and said alkylene imines and the N-substituted derivatives thereof.

8. The method according to claim 7 wherein said contacting is effected after the formed graft copolymer is subjected to a molding operation.

9. The method according to claim 7 wherein said material selected from the group consisting of acrylic acid, methacrylic acid, the derivatives thereof which are hydrolyzed into a compound selected from the group consisting of acrylic acid and methacrylic acid under the operating conditions maintained during copolymerization and mixtures thereof is mixed with the other vinyl monomers.

10. The method as defined in claim 7 in which the quantity bonded by graft copolymerization to said polyolefin of said compound selected from the group consisting of acrylic acid, methacrylic acid and the derivatives thereof is 0.05–10 percent by weight.

11. The method as defined in claim 10 wherein said polyolefins are selected from the group consisting of polyethylene, polypropylene, poly (butene-1), poly (3-methyl butene-1), poly (4-methyl pentene-1), polybutadiene, ethylene-propylene copolymer, ethylene-butene-1 copolymer, and propylene-butene-1 copolymer.

References Cited by the Examiner

UNITED STATES PATENTS

| | | | |
|---|---|---|---|
| 2,418,696 | 4/47 | Cameron et al. | 8—100 |
| 3,073,667 | 1/63 | Bonvicini et al. | 260—877 |
| 3,079,312 | 2/63 | Alsys | 260—878 |
| 3,112,159 | 11/63 | Cappuccio et al. | 8—55 X |
| 3,131,990 | 5/64 | Bonvincini et al. | 8—100 X |

FOREIGN PATENTS

| | | |
|---|---|---|
| 791,453 | 3/58 | Great Britain. |
| 873,830 | 7/61 | Great Britain. |

MURRAY TILLMAN, *Primary Examiner.*

JAMES A. SEIDLECK, *Examiners.*